United States Patent [19]
Bauer et al.

[11] Patent Number: 5,467,000
[45] Date of Patent: Nov. 14, 1995

[54] METHOD AND APPARATUS FOR CURRENT REGULATING IN A VOLTAGE-INJECTING CONVERTER

[75] Inventors: Franz Bauer, Herzogenaurach; Hubert Schierling, Erlangen, both of Germany

[73] Assignee: Siemens Aktiengesellschaft, Munich, Germany

[21] Appl. No.: 272,718

[22] Filed: Jul. 8, 1994

[30] Foreign Application Priority Data

Jul. 9, 1993 [EP] European Pat. Off. ............... 93111046

[51] Int. Cl.$^6$ ..................................................... H02P 7/00
[52] U.S. Cl. ........................... 318/432; 318/800; 318/808
[58] Field of Search ...................... 318/798–811, 432–434

[56] References Cited

U.S. PATENT DOCUMENTS 5,151,853  8/1992  Tatara et al. ............................. 363/160
5,270,498  12/1993  Tanahashi ................................ 318/801

*Primary Examiner*—David S. Martin
*Attorney, Agent, or Firm*—Kenyon & Kenyon

[57] ABSTRACT

The present invention provides a current regulating method and associated apparatus for a voltage-injecting converter, wherein a flux-producing current component and a torque-producing current component of an actual current vector are regulated to corresponding components of a required current vector, whereby a precontrol variable is superimposed on each controller manipulated variable. According to the invention, the torque-producing controller manipulated variable acts on the flux-producing controller manipulated variable with delay as a function of a frequency variable, thereby providing a current regulating method which combines the advantages of two-component current regulation and active current regulation. This dual-action current regulation advantageously operates without requiring a structural switch between the two forms of current regulation.

11 Claims, 1 Drawing Sheet

METHOD AND APPARATUS FOR CURRENT REGULATING IN A VOLTAGE-INJECTING CONVERTER

BACKGROUND OF THE INVENTION

The present invention relates to the field of current regulation for electrical devices, and in particular to a method and apparatus for regulating current in a voltage-injecting converter wherein the converter is capable of automatically switching between two-component current regulation and active current regulation in response to operating conditions. According to the invention, a flux-forming current component and a torque-forming current component of an actual current vector are determined and regulated to a current component of a desired current vector, with a precontrol value superimposed over each controlled variable.

Polyphase machines with regulated drives may require the injection of desired currents into the machine. Where this current is provided by a converter with a desired voltage value input, such as a pulse converter or direct converter type of voltage-injecting converter, the required voltages must be determined so that the desired currents appear in the machine. The dynamics of the drive are therefore dependent on how well the actual current value conforms to the required current value.

A required current may be generated in several ways. For example, "IEEE Transactions on Industry Applications," vol. IA–16, no. 2, 186–192 (March/April 1980) and "IEEE Transactions on Industry Applications," vol. IA–22, no. 4, 691–696 (July/August 1986) disclose a current regulation method which uses two current regulators to control two components of a current vector to desired values. The current regulators are supported by a pilot control which calculates the voltages required by the machine, although the current regulators must also output voltages which are not determined by the pilot control (e.g., dynamic components, errors, etc.). The currents are advantageously regulated in a field-oriented system, because in such a system of coordinates the currents are easily-regulated direct currents and the required voltages for pilot control of the current regulators can easily be calculated. This regulating method is referred to as two-component current regulation, and is characterized by very good dynamic behavior, especially in low and medium RPM ranges.

A disadvantage of two-component regulation arises from coupling between the two regulating circuits, a phenomenon that steadily increases with RPM. This coupling can appear as a disturbance in slow discharge processes having an unbalanced precontrol network, especially at low regulator amplifications. Moreover, two-component current regulation with high modulation can only operate when a voltage reserve is available. Since a blind current component (as opposed to a flux) is injected, the drive reacts with great sensitivity to an improper setting of the main inductance. As a rule, therefore, superimposed flux regulation is required in such devices.

A further disadvantage of two-component regulation is that its stability depends on the frequency and regulating amplification of the current regulator. The higher the frequency or the smaller the amplification, the poorer will be the damping of the regulation; however, it is precisely at such higher frequencies that control amplification must be withdrawn due to reduced dynamics of the rectifier. Another difficulty arises in field-weakening operation. Here, the field must be weakened in two-component current regulation to the point where a certain control reserve is still available, thus reducing rectifier utilization.

A second type of current regulation, known as active current regulation, is disclosed in "RPM Regulation Around Zero," Journal Elektrotechnik, vol. 74, no. 7/8, 24–31 (Aug. 21, 1992). Here, as in two-component current regulation using a pilot control, the required voltage value is determined in field-oriented coordinates. Unlike two-component current regulation, the current is only regulated in the torque-producing direction through a frequency change in the required voltage regulator. The second current component, the magnetization current, adjusts itself. Thus, only one of the two current components of a motor current in the field-oriented system of coordinates is regulated. Stator frequency is manipulated to accomplish this regulation, with the components of the stator voltage following exclusively from a precontrol network.

If the control limit of the rectifier is reached in this case, the active current regulator is still able to regulate the active current to a certain value through a frequency change. A superimposed voltage maximum regulation feeds the precontrol network by way of approximation with the magnetization current actually flowing in the machine. The transition from basic RPM to field-weakening operation is accomplished without difficulty, enabling use of the maximum control range. A superimposed voltage maximum regulation matches, within the field weakness range, the magnetization current required value for the precontrol network.

The advantages of active current regulation lie in its performance at high-rotational speeds and its high degree of control. Moreover, active current regulation requires no voltage reserve, and the transition to field-weakening operation occurs smoothly. Also, since voltage is calculated and injected depending on a desired flux, no superimposed flux regulation is required.

On the other hand, active current regulation has certain disadvantages compared to two-component current regulation. Because the current regulator influences only the frequency of the required voltage value, active current regulation exhibits only a slight dynamic. Another difficulty arises at low frequencies, where the length and position of the voltage setpoint indicator is such that the desired change in the active current cannot be produced by the active current regulator through a change in frequency. In other words, active current regulation is inoperable below a minimum frequency.

SUMMARY OF THE INVENTION

A method and apparatus for current regulation according to the present invention combines the advantages of two-component current regulation and active current regulation, while avoiding the disadvantages of each. Switching between the two forms of regulation occurs automatically.

According to one embodiment of the present invention, two-component current regulation is expanded by a cross channel that connects an output voltage from a regulator in the active axis to a regulator voltage in the blind axis through a delay element. Thus, the output of the regulator in the active axis not only changes the active voltage (as in two-component current regulation), but also produces rotation of the voltage indicator through a change in the blind voltage (as in active current regulation). At the same time, this cross channel ensures that a change in the output voltage on the active axis does not influence the blind current, thus decoupling the regulating circuits. Accordingly, the slow-compensating processes typical of two-component current regulation in an unbalanced part of a control network no longer exist. For ideal decoupling, the time constant of the delay element is matched to the short-circuit time constant of the motor, with the amplification variable set in proportion to the stator frequency.

Superimposed flux regulation can be dispensed with when the integral component of the regulator is sharply delimited in the blind axis. Since this integral component is required only at low RPM, a frequency-dependent limiting characteristic is required.

The current regulating method according to the present invention combines the advantages of two-component current regulation and active current regulation in ideal fashion. As long as the voltage is not limited, the new structure exhibits the good dynamic behavior of two-component current regulation, but reacts less sensitively to an unbalanced precontrol network. On reaching the voltage ceiling, it automatically changes to the behavior of active current regulation without requiring a structural switch. In addition, the stability in the field weakness range is even better with this new regulating structure than in active current regulation. As in active current regulation, operation with fixed control (e.g., pure full-block cycling) is also possible.

An advantageous feature of the present invention is its ability to ensure optimum control by adapting the coefficients of regulation. This can be accomplished in a number of ways, including (1) changing the proportional component and/or the integral component of the regulator on the blind axis; (2) changing the amplification factor of the cross channel; (3) changing the time constant of the cross channel; or (4) some combination of these approaches, since the line behavior changes at the control limit. These changes in coefficients may occur as a function of a degree of control, a stator frequency, or RPM.

DETAILED DESCRIPTION

Figure 1:
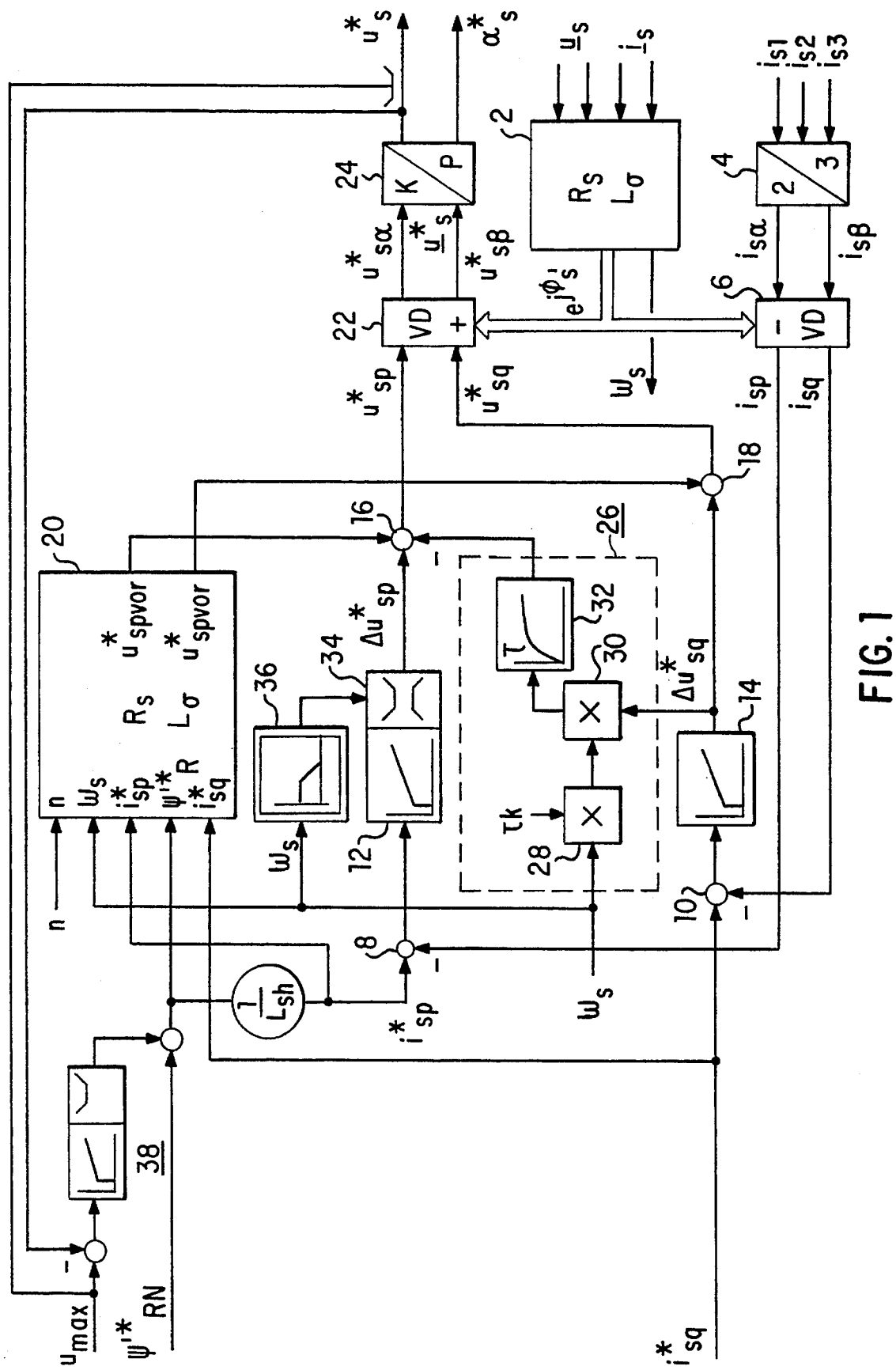
FIG. 1 is a block diagram showing a preferred embodiment of a current regulating device according to the present invention.

FIG. 1 shows an embodiment of an apparatus for regulating current in a voltage-injecting converter according to the method of the present invention. In this embodiment, the stator currents of an asynchronous machine are regulated in a system of coordinates rotating with a stator frequency $\omega_s$, oriented as a rule at flux angle $\Phi'_s$. This type of regulation, termed vector regulation, makes it possible to control an asynchronous machine (at least from a regulating standpoint) in the same manner as a direct current machine.

With the aid of transformation equations for a multiphase machine, the present invention provides a two-phase model in which a flux-producing current component $i_{sp}$ and a torque-producing current component $i_{sq}$ are regulated independently of one another. Upon a change in load, the torque-producing current component $i_{sq}$ is immediately regulated to its new value, while the flux-producing current component $i_{sp}$ remains constant. The required value in this current regulating method consists of two components $u^*_{sp}$ and $u^*_{sq}$ of a stator voltage $u_s$ (in the system of coordinates used in this embodiment) since regulation is provided for a voltage-injecting converter such as a pulse converter, or a direct converter.

To determine the flux-producing and torque-producing current components $i_{sp}$ and $i_{sq}$, vector regulation requires knowledge of certain values in an equivalent circuit diagram of the asynchronous machine (for example, winding resistance $R_S$, leakage inductance $L_G$ and main inductance $L_h$), as well as an actual rotational speed value n. A flux calculator 2 to which an actual voltage vector $u_s$ and an actual current vector $i_s$ are fed determines the value of the rotor flux $\psi'_R$ and its position $\Phi'_s$ from coefficients $R_S$ and $L_G$. Examples of suitable flux calculators are disclosed in "Field-Oriented Control in Modern Drive Technology," Proceedings of the Seminar on Variable Speed A-C Drives, II47–II56 (Jun. 7–8, 1993), the disclosure of which is expressly incorporated herein by reference. The determined flux position $\Phi'_s$ is used by a coordinate converter 4 and a vector rotator 6 to transform a set of measured phase currents $i_{s1}$, $i_{s2}$ and $i_{s3}$ into the flux-producing component $i_{sp}$ and the torque-producing component $i_{sq}$. As is known in the art, the flux calculator 2, coordinate converter 4 and vector rotator 6 may be combined into a single unit called an actual value calculator.

The current components $i_{sp}$ and $i_{sq}$, once determined, are fed to comparators 8 and 10 respectively, to which non-inverting inputs in the form of required current component values $i^*_{sp}$ and $i^*_{sq}$ are applied. An output from each comparator 8, 10 is coupled to a current regulator 12, 14, which in turn is coupled to an adder 16, 18. The current regulators 12, 14 may be proportional integrators acting as regulators. A precontrol network 20 supports the current regulators 12, 14 such that precontrol values $u^*_{spvor}$ and $u^*_{sqvor}$ are determined and respectively supplied to adders 16 and 18. Thus, the current regulators 12 and 14 must deliver at their outputs only voltages $\Delta u^*_{sp}$ and $\Delta u^*_{sq}$ that are not determined by the precontrol network 20 (e.g., dynamic components, errors, etc.).

The outputs of the two adders 16, 18 are fed downstream to a second vector rotator 22 and a coordinate converter 24. The vector rotator 22 and coordinate converter 24 initially change the applied voltage components $u^*_{sp}$ and $u^*_{sq}$ into stator-oriented voltage components $u^*_{s\alpha}$ and $u^*_{s\beta}$ disposed at right angles to one another. These cartesian stator-oriented voltage components $u^*_{s\alpha}$ and $u^*_{s\beta}$ are then transformed into polar voltage components $u^*_s$ and $\alpha^*_s$. The portion of the apparatus just described provides the two-component current regulating feature of a method according to the present invention, and is described in the article cited above, the disclosure of which is expressly incorporated herein by reference.

The precontrol network 20, also called a decoupling network, is known in the art and is described in the above-referenced article; thus, only features important to an understanding of the present invention are described herein. The precontrol network 20 requires the following input parameters: actual rotational speed n, stator frequency $\omega_s$, rotor flux setpoint $\psi'^*_R$ and the flux-producing and torque-producing current component required values $i^*_{sp}$ and $i^*_{sq}$. In addition, the precontrol network 20 requires the values of coefficients relating to stator resistance $R_S$ and leakage inductance $L_G$. Using this information, the precontrol network 20 calculates anticipated voltage components $u^*_{spvor}$ and $u^*_{sqvor}$, which are supplied to relieve the load on the current regulators 12, 14 at their regulating outputs. The total required voltage components for the desired current components $i^*_{sp}$ and $i^*_{sq}$ are calculated by the precontrol network 20. Assuming the parameters $R_S$ and $L_G$ of the precontrol network 20 are properly set, the current regulators 12 and 14 will respectively output a regulating set value $\Delta u^*_{sp}$ and $\Delta u^*_{sq}$ that is equal to 0 so that $u^*_{spvor}=u^*_{sp}$ and $u^*_{sqvor}=u^*_{sq}$.

If the regulating channel for the flux-producing current component $i_{sp}$ were removed from the embodiment of FIG. 1, the result would essentially be a regulating structure for active current regulation. Again, the specific structure required for active current regulation is known in the art and is disclosed in the above-referenced article, the disclosure of which is expressly incorporated herein by reference. In active current regulation, only the active current (that is, the torque-producing current component $i^*_{sq}$) is regulated. The adjusting value in this type of regulation is the stator frequency $\omega_s$. The required voltage component values $u^*_{sp}$ and $u^*_{sq}$, as in two-component current regulation, are determined by the precontrol network 20.

A regulating method according to the present invention advantageously combines the features of two-component current regulation and active current regulation. To this end, the two-component current regulation is expanded by a cross channel 26 that switches the output voltage $\Delta u^*_{sq}$ from current regulator 14 on the active axis to regulating voltage $\Delta u^*_{sp}$ of current regulator 12 on the blind axis.

The cross channel 26 includes two multipliers 28, 30 and a lowpass 32 (also termed a delay element). The multipliers 28, 30 are serially connected downstream from an input to the cross channel 26, with lowpass 32 connected ahead of an output from the cross channel 26. The first multiplier 28 links one input signal, stator frequency $\omega_s$, with the coefficients time constant $\tau$ and amplification factor k. Other inputs may optionally be used, including RPM n, modulation amplitude a, or another parameter proportional to the frequency. The second multiplier 30 then multiplies the resultant frequency value $\tau k\omega_s$ by a second input parameter $\Delta u^*_{sq}$. The product, a frequency-dependent voltage component $\Delta u^*_{sq}\tau k\omega_s$, is then switched using delay element 32 to adder 16 on the blind axis.

As will be apparent to those skilled in the art, the output of regulator 14 on the active axis not only changes the active voltage $u^*_{sq}$ (as in two-component current regulation) but also, by changing blind voltage $u^*_{sp}$, rotates voltage indicator $u^*_{sp}$ (as in active current regulation). At the same time, the cross channel 26 ensures that a change in output voltage $u^*_{sq}$ on the active axis does not influence blind current $i_{sp}$; thus, the regulating circuits are decoupled. Accordingly, the typically slow compensating processes for two-component regulation with an unbalanced precontrol network 20 no longer occur. For ideal decoupling, the time constant of delay element 32 should be equal to the short-circuit time constant of the motor, and the amplification factor k should be proportional to the stator frequency $\omega_s$.

Looking at the operation of the cross channel 26 in greater detail, when the parameters of the precontrol network 20 are properly set, both of the current regulators 12 and 14 will output regulating adjusting parameters $\Delta u^*_{sp}$ and $\Delta u^*_{sq}$ which are equal to 0. Similarly, cross channel 26 should deliver 0 at its output. During a regulating movement of the regulator 14 in the q-axis, without cross channel 26, initially only the voltage in the axis itself changes. It is only when the actual current $i_{sp}$ varies as a result of the regulating motion that current regulator 12 generates the required change in voltage $\Delta u^*_{sp}$ in the p-direction.

Cross channel 26 directly calculates the correct voltage $\Delta u^*_{sp}$ for regulating motion $\Delta u^*_{sq}$, thereby avoiding a compensating process involving current regulator 12 in the p-axis. Cross channel 26 therefore advantageously stabilizes the two-component current regulation, especially at higher RPM values.

The p-component of current regulator 12, again assuming the pilot control parameters are correctly set, delivers 0 at the output in precontrol network 20. When the control limit is reached, the integral component of regulator 12 would ordinarily diverge from it. This divergence can be prevented by limiting the integral component as a function of frequency in a way that the integral component becomes 0 at the control limit. For this purpose, current regulator 12 is provided with a limiter 34 whose control input is connected to an output of a function generator 36, to which a stator frequency $\omega_s$ is applied. Alternatively, an RPM n, a modulation amplitude a, or another frequency-proportional value may be applied to the function generator.

Several effects upon the behavior of regulation occur as soon as the limitation becomes effective. For example, the remaining regulator 14 on the q-axis works directly on the voltage component set value $u^*_{sq}$ and indirectly (through the cross channel 26) on the p-component $u^*_{sp}$. During operation at the control limit, $u^*_{sq}$ is large relative to $u^*_{sp}$, and amplification factor k of the cross channel 26 is large (approximately 5 to 15). A regulating movement $\Delta u^*_{sq}$ therefore leads primarily to rotation of the voltage set indicator $u^*_s$. This rotation is limited in amplitude so that at the control limit the regulator 14 influences only the angle, and thus the frequency. This action corresponds exactly to the operation of an active current control. The transition from two-component current regulation (whose behavior is improved by the cross channel 26) is thus completed when the control limit is reached. The control limit can be set as a desired maximum control or, alternatively, it may correspond to the maximum control that can be provided by the rectifier.

Since line behavior changes at the control limit, modification can be made to ensure optimum regulating characteristics. For example, the P and I components of regulator 14 on the q-axis can be changed, the amplification factor k of cross channel 26 can be changed, the time constant $\tau$ of cross channel 26 can be changed, or some combination of the above.

During operation under a field-weakness condition, rotor flux $\psi'^*_R$ (and thus the current $i_{sp}$ in the magnetizing direction) may fall below its rated value. The current regulator 12 on the p-axis, due to a resulting limitation at its output, may then stop operating. In order to feed the precontrol network 20 for good regulating properties with the magnetizing current which is actually present in the machine, a voltage maximum regulation 38 can also be applied. This regulation 38 lowers the rotor flux $\psi'^*_R$ in the precontrol network 20 to the point where the amount of the required voltage $u^*_s$ drops to a given maximum voltage $u_{max}$. Thus, an internal regulating loop that is not effective through the machine is formed. This regulating loop uses $u_{max}$ to determine the correct rotor flux $\psi'^*_R$ and the correct current component $i^*_{sp}$, and is only active during field-weakness operation. Moreover, it can only lower $\psi'^*_R$, not raise it.

From the foregoing description, it should be apparent that the current regulating method and apparatus of the present invention combines the advantages of two-component current regulation and active current regulation in nearly ideal fashion. As long as the voltage is not limited, the new structure exhibits the good dynamic behavior of two-component current regulation, but reacts with less sensitivity to an unbalanced precontrol network. When the voltage ceiling is reached, the structure automatically switches its behavior to active current regulation without the need for a structural switch. Moreover, the stability in the field-weakness range for the new structure is even better than in previously-known active current regulation approaches. As with active current regulation, operation with fixed control (e.g., pure full-block cycling) is also possible.

While the present invention has been described with reference to a preferred embodiment, persons skilled in the art will recognize that many variations and modifications are possible. Accordingly, the present invention is intended to include all such variations and modifications that fall within the scope and spirit of the appended claims.

What is claimed:

1. A method for regulating current in a voltage-injecting converter using an actual current vector, wherein the voltage-injecting converter includes a precontrol network, said method comprising the steps of:

(a) determining an actual flux-producing current component and an actual torque-producing current component of the actual current vector;

(b) regulating said actual flux-producing current component to a desired flux-producing current component of a set current vector, wherein a flux-producing manipulated variable is superimposed with a first precontrol value provided by the precontrol network; and (c) regulating said actual torque-producing current component to a desired torque-producing current component of said set current vector, wherein a torque-producing manipulated variable is superimposed with a second precontrol value provided by the precontrol network, said torque-producing manipulated variable acting in a delayed manner on said flux-producing manipulated variable as a function of a frequency value generated from a time constant, an amplification factor and a stator frequency.

2. The current regulating method of claim 1, further comprising the step of varying as a function of said stator frequency at least one of said said time constant, said amplification factor, a proportional coefficient used in said regulation of said actual flux-producing current component, and an integral coefficient used in said regulation of said actual flux-producing current component.

3. The current regulating method of claim 1, further comprising the step of varying as a function of a modulation amplitude at least one of said time constant, said amplification factor, a proportional coefficient used in said regulation of said actual flux-producing current component, and an integral coefficient used in said regulation of said actual flux-producing current component.

4. A current regulating apparatus for a voltage-injecting converter, comprising a flux-producing regulating channel and a torque-producing regulating channel, with each of said regulating channels including a regulator, a comparator coupled to an input of said regulator, and an adder coupled between an output of said regulator and a precontrol network, wherein said output of said regulator of said torque-producing regulating channel is coupled to said adder of said flux-producing regulating channel through a cross channel having a second input to which a stator frequency signal is applied.

5. The apparatus of claim 4, wherein said cross channel comprises:

(a) a first multiplier having a first input for receiving said stator frequency signal, a second input for receiving a time constant and an amplification factor, and an output for emitting a resulting frequency value;

(b) a second multiplier having a first input coupled to said output of said first multiplier, a second input coupled to said output of said regulator of said torque-producing regulating channel, and an output for emitting a product of said first and second inputs; and (c) a delay element having an input coupled to said output of said second multiplier and an output coupled to said adder of said flux-producing regulating channel.

6. The apparatus of claim 4, wherein said regulator of said flux-producing regulating channel includes a limiter having a control input coupled to an output of a function generator, said function generator having an input to which is applied said stator frequency signal.

7. The apparatus of claim 5, wherein said regulator of said flux-producing regulating channel includes a limiter having a control input coupled to an output of a function generator, said function generator having an input to which is applied a signal corresponding to a modulation amplitude.

8. The apparatus of claim 4, wherein said second input of the first multiplier of said cross channel is coupled to a function generator having an input at which said stator frequency signal is applied.

9. The apparatus of claim 4, wherein said second input of the first multiplier of said cross channel is coupled to a function generator having an input at which a signal corresponding to a modulation amplitude is applied.

10. The apparatus of claim 4, wherein said current regulating apparatus comprises a microcomputer.

11. A cross channel enabling a voltage-injecting converter to switch between a two-component current regulation and an active current regulation mode of operation in response to an operating condition of the voltage-injecting converter, the voltage-injecting converter including a flux-producing regulating channel and a torque-producing regulating channel, said cross channel being coupled between said flux-producing regulating channel and said torque-producing regulating channel and comprising:

(a) a first multiplier having a first input to which a stator frequency is fed and a second input to which a time constant and an amplification factor are fed, said first multiplier generating a product of said first and second inputs and emitting said product at an output;

(b) a second multiplier having a first input coupled to said output of said first multiplier and a second input to which is fed a signal from the torque-producing regulating channel of the voltage-injecting converter, said second multiplier generating a product of said first and second inputs and emitting said product at an output; and (c) a delay element having an input coupled to said output of said second multiplier, said delay element acting on said product from said second multiplier and outputting a signal to an adder component of the flux-producing regulating channel of the voltage-injecting converter, wherein said cross channel causes the voltage-injecting converter to switch from the two-component current regulation mode to the active current regulation mode when a control limit of the torque-producing regulating channel is reached.

* * * * *